US010761804B2

(12) United States Patent
Miron (10) Patent No.: US 10,761,804 B2
(45) Date of Patent: Sep. 1, 2020

(54) METHOD FOR DETECTING USAGE OF A SCREEN READER AND SYSTEM THEREOF (71) Applicant: USER1ST LTD., Tel Aviv (IL)

(72) Inventor: Amihai Miron, Kiriat Ono (IL)

(73) Assignee: USER1ST LTD., Tel Aviv (IL)

( * ) Notice: Subject to any disclaimer, the term of this patent is extended or adjusted under 35 U.S.C. 154(b) by 0 days.

(21) Appl. No.: 15/663,945

(22) Filed: Jul. 31, 2017

(65) Prior Publication Data

US 2019/0026072 A1 Jan. 24, 2019

(30) Foreign Application Priority Data

Jul. 19, 2017 (IL) .......................... 253587

(51) Int. Cl.
G06F 3/048 (2013.01)
G06F 3/16 (2006.01)
G06F 3/0484 (2013.01)
G09B 21/00 (2006.01)
G06F 11/34 (2006.01)

(52) U.S. Cl.
CPC ............ *G06F 3/167* (2013.01); *G06F 3/0484* (2013.01); *G06F 11/34* (2013.01); *G09B 21/00* (2013.01); *G09B 21/001* (2013.01); *G09B 21/008* (2013.01)

(58) Field of Classification Search
CPC ......... G06F 3/167; G06F 3/0484; G06F 3/048
See application file for complete search history.

(56) References Cited

U.S. PATENT DOCUMENTS

| 2002/0112093 | A1* | 8/2002 | Slotznick | G06F 9/543 719/329 |
| 2007/0211071 | A1* | 9/2007 | Slotznick | G06F 16/957 345/594 |
| 2010/0070872 | A1 | 3/2010 | Trujillo | |
| 2013/0332815 | A1* | 12/2013 | Gallo | G09B 21/008 715/234 |
| 2014/0180846 | A1* | 6/2014 | Meron | G06Q 30/0277 705/14.73 |
| 2015/0106686 | A1 | 4/2015 | Blitzstein | |

* cited by examiner

*Primary Examiner* — Jeanette J Parker
(74) *Attorney, Agent, or Firm* — Vorys, Sater, Seymour and Pease LLP (57) ABSTRACT The presently disclosed subject matter includes a computerized method and computerized system, which enables to detect usage of a screen reader, by modifying screen reader functionality of elements in a webpage.

7 Claims, 5 Drawing Sheets

203 disabling the first readable text associated with the element 301 associating the element with a modified readable text, which in turn, having at least one predefined modified user input 303

Fig. 4

400 receiving an application screen including an element associated with a screen reader functionality, the screen reader functionality includes a first readable text having at least one corresponding first user input associated with the element 401 modifying the screen reader functionality of the element, by disabling the first readable text associated with the element 403 providing an activation method including a new element associated with a modified readable text, having at least one predefined modified user input 405 providing the application screen with the activation method 407

Fig. 5

METHOD FOR DETECTING USAGE OF A SCREEN READER AND SYSTEM THEREOF

TECHNICAL FIELD

The presently disclosed subject matter relates to accessibility of a website and, more particularly, to detection of usage of screen readers by users.

BACKGROUND

Web accessibility refers to computerized tools used by website designers and developers in order to enable interaction with websites for visually impaired users, such as users with reading difficulties or blind users. For example, designers may include text and images that are large in size, or that may be enlarged, in order to provide visually impaired users with the ability to read and understand the content of the page. Another visual tool for enhancing the accessibility of a website is underlining and coloring the links, such that color blind users may more easily detect the links.

In addition to the visual design of a webpage, website designers may also provide infrastructure for usage of other computerized accessibility tools. Screen reader software is one example of a computerized accessibility tool, often used by visually impaired users, that converts digital text into synthesised speech. Screen reader software allow users to listen to content in a website, rather than view the displayed content visually. The screen reader reads out text which is associated with elements displayed in the webpage. The text is often semantically meaningful names of the elements, thus allowing users to navigate the website while listening to the text being read out by the screen reader. A text can be embedded or associated with any element being displayed on the webpage, such as HTML tags, links, icons, menus, dialogue boxes, menus, files and folders.

If a website is properly designed from the accessibility standpoint, i.e. elements of the website have corresponding screen reader functionality and are associated with meaningful readable text, users with disabilities, such as users that are using screen readers, may operate the screen reader function at the user's end, when browsing the website, without requiring authorization or providing any notification to the website operator. Thus, the website operator has no knowledge of whether the screen reader has been operated by a user of the website or not. Moreover, the website operator is unable to obtain information on screen reader usage. The reason is that it may be technically difficult to detect screen readers in the same ways as detecting browser version or screen resolution that are being used by a user's device such as a computer or mobile. While information on browser version or screen resolution can be obtained by a server (in this case, also the website operator) upon receipt of "User-Agent" string, which is sent from the client and includes information that the client sends to the server, screen reader is a third party software application that "lives" on top of the browser and operates directly with the operation system. Therefore, information on usage of a screen reader cannot be obtained by the website operator.

Problems of detecting screen reader users have been recognized in the conventional art and some techniques have been developed to provide solutions. For example, several Windows screen readers make use of the Microsoft Active Accessibility (MSAA) layer, which is an API that enables access technologies to interact with standard and custom UI objects. Applications (such as the Flash Technique) that are intended to detect the usage of screen readers, rely on information that is provided by the MSAA layer to determine usage of screen readers. However, apart from the fact that these applications are limited to usage of specific software/modules (such as Flash or the MSAA layer) or that are Windows based-solutions only, these applications cannot distinguish between usage of screen readers and other accessibility tools, such as a screen magnifier, or a speech recognition application.

Obtaining information on the volume of visually impaired users using a website may motivate website operators to design the website in a more accessible manner. Such information may rely on the amount of usage of screen reader software by users. Accordingly, there is a need for new methods and systems that can facilitate detection of screen reader usage.

GENERAL DESCRIPTION

According to one aspect of the presently discloses subject matter there is provided a method for detecting usage of a screen reader, the method comprising:
 receiving a webpage including at least one element associated with screen reader functionality, the screen reader functionality includes a first readable text having at least one corresponding first user input associated with the element;
 modifying the screen reader functionality of said at least one element; and
 providing said webpage for detecting usage of screen reader.

In addition to the above features, the method according to the above aspect can optionally comprise one or more of features (i) to (iv) below, in any technically possible combination or permutation:
 (i) wherein modifying includes:
  disabling the first readable text associated with said at least one element; and
  associating said at least one element with a modified readable text, said modified readable text having at least one predefined modified user input;
  wherein receipt of said predefined modified user input is indicative of usage of screen reader.
 (ii) the method further comprising:
  receiving an initial first user input;
  identifying that said initial user input is associated with said element having the modified screen reader functionality;
  activating the modified screen reader functionality of the element;
  receiving a user input;
  determining whether the user input corresponds to at least one of the predefined modified user inputs of the modified screen reader functionality; if the user input corresponds to at least one of the predefined modified user inputs of the modified screen reader functionality, detecting usage of screen reader; and
  performing an action.
 (iii) wherein performing an action includes at least one of performing analytics, and disabling the modified readable text associated with said at least one element and associating said at least one element with a first readable text.

According to another aspect of the presently disclosed subject matter there is provided a method for detecting usage of a screen reader, the method comprising:
 receiving an application screen including at least one element associated with screen reader functionality, the screen reader functionality includes a first readable text having at least one corresponding first user input associated with the element;

modifying the screen reader functionality of the element, by disabling the first readable text associated with the element;

providing an activation method including a new element associated with a modified readable text, having at least one predefined modified user input, wherein receipt of said predefined modified user input is indicative of usage of screen reader; and providing the application screen with the activation method.

In addition to the above features, the method according to the above aspect can optionally comprise a feature wherein the new element of the activation method is invisible.

According to another aspect of the presently disclosed subject matter there is provided a method for detecting usage of a screen reader, comprising:

providing a webpage including an element having a modified screen reader functionality, the modified screen reader functionality includes a modified readable text having at least one predefined modified user input;

receiving an initial user input;

identifying that the initial user input is associated with the element having the modified screen reader functionality;

activating the modified screen reader functionality of the element;

receiving a user input; and if the user input corresponds to at least one of the predefined modified user inputs of the modified screen reader functionality, detecting usage of a screen reader; and performing an action.

According to another aspect of the presently disclosed subject matter there is provided a computerized system capable of detecting usage of screen reader, the system comprising processing circuitry, comprising a processor operatively connected to a memory, wherein the processor is configured to:

provide a webpage including an element having a modified screen reader functionality, the modified screen reader functionality includes a modified readable text having at least one predefined modified user input;

receive an initial user input;

identify that the initial user input is associated with the element having the modified screen reader functionality;

activate the modified screen reader functionality of the element;

receive a user input;

if the user input corresponds to at least one of the predefined modified user inputs of the modified screen reader functionality, detect usage of a screen reader.

According to another aspect of the presently disclosed subject matter there is provided a computer program product implemented on a non-transitory computer useable medium having computer readable program code embodied therein for detecting usage of a screen reader, the computer program product comprising:

computer readable program code for receiving a webpage including at least one element associated with screen reader functionality, the screen reader functionality includes a first readable text having at least one corresponding first user input associated with the element;

computer readable program code for modifying the screen reader functionality of the at least one element, by disabling the first readable text associated with the at least one element and associating the at least one element with a modified readable text, the modified readable text having at least one predefined modified user input, wherein receipt of the predefined modified user input is indicative of usage of a screen reader; and computer readable program code for providing the webpage for detecting usage of a screen reader.

According to another aspect of the presently disclosed subject matter there is provided a computerized system capable of detecting usage of a screen reader, the system comprising processing circuitry, comprising a processor operatively connected to a memory, wherein the processor is configured to:

provide a webpage including an element having a modified screen reader functionality, the modified screen reader functionality includes a modified readable text having at least one predefined modified user input;

receive an initial user input;

identify that the initial user input is associated with the element having the modified screen reader functionality;

activate the modified screen reader functionality of the element;

receive a user input;

if the user input corresponds to at least one of the predefined modified user inputs of the modified screen reader functionality, detect usage of a screen reader.

According to another aspect of the presently disclosed subject matter there is provided a computer program product implemented on a non-transitory computer useable medium having computer readable program code embodied therein for detecting usage of a screen reader, the computer program product comprising:

computer readable program code for providing a webpage including an element having a modified screen reader functionality, the modified screen reader functionality includes a modified readable text having at least one predefined modified user input;

computer readable program code for receiving an initial user input;

computer readable program code for identifying that the initial user input is associated with the element having the modified screen reader functionality;

computer readable program code for activating the modified screen reader functionality of the element;

computer readable program code for receiving a user input;

if the user input corresponds to at least one of the predefined modified user inputs of the modified screen reader functionality, computer readable program code for detecting usage of a screen reader.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "receiving", "modifying", "providing", "disabling", "associating", "identifying", "activating", "performing", "detecting", "determining" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, detection system 100 and processing circuitry therein disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
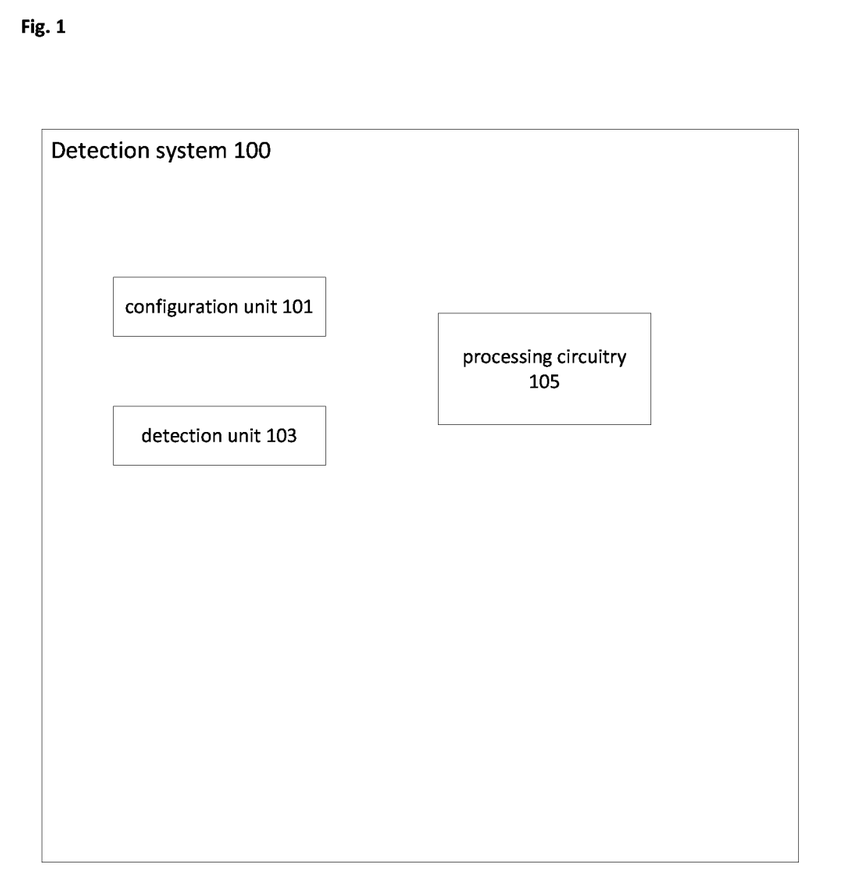
FIG. 1 illustrates a block diagram of a detection system in accordance with certain embodiments of the presently disclosed subject matter.

Bearing this in mind, attention is drawn to FIG. 1 illustrating a diagram of a detection system 100. The illustrated detection system comprises configuration unit 101 and detection unit 103 configured to modify a website for detecting usage of a screen reader and operatively coupled to processing circuitry 105 comprising a processor operatively connected to a memory (not shown separately within the processing circuitry).

As will be further described with reference to FIG. 1, the processing circuitry 105 can be configured to execute several functional modules in accordance with computer-readable program code implemented on a non-transitory computer-readable storage medium. Such functional modules are referred to hereinafter as comprised in the processing circuitry.

It is noted that the teachings of the presently disclosed subject matter are not bound by the detection system described with reference to FIG. 1. Equivalent and/or modified functionality can be consolidated or divided in another manner and can be implemented in any appropriate combination of software with firmware and/or hardware and executed on a suitable device.

Often, a website includes several elements displayed in each of the webpages in the website. Some examples of elements include icons, menus, dialogue boxes, files and folders. When a user, e.g. a visually impaired user, activates a screen reader on the computer, and enters a website with accessibility functions, the screen reader is able to read out a text associated with each of the elements. This is done, e.g. in response to the user hovering over one or more elements. The read out text enables the visually impaired user to interact with the website and perform actions in the website.

In a webpage that was built in an accessible manner, an element included in a webpage is associated with a readable text. The readable text has corresponding user input, which is associated with the element. The element may have more than one corresponding user input, which is associated with the element. For example, a drop down menu element, displayed in the home page, may have an associated readable text of the name of the menu item, and an announcement of: "to move through items, press the up or down arrow". The user may then navigate through the menu (exemplifying a user input), pressing the up or down arrows, while each menu element may have a respective readable text associated therewith.

Since the server (e.g. implementing the website for instance by a service provider), which by non-limiting example can be detection system 100 illustrated in FIG. 1, does not receive any input or indication whether a readable text was read by the screen reader at the user's end, the website may be modified at the server (e.g. by the service provider) so as to force the user to provide him with an input that is indicative of usage of a screen reader by the user.

With reference to FIG. 1, according to certain embodiments of the presently disclosed subject matter, detection system 100 comprises configuration unit 101 and detection unit 103. According to certain embodiments of the presently disclosed subject matter, configuration unit 101 is configured to modify a webpage at a configuration stage, by modifying the screen reader functionality of elements included in the webpage, and to provide a modified webpage, by displaying it to a user. Once a user enters the modified webpage, detection unit 103 is configured to activate the modified screen reader functionality of the element. The user may then provide input that corresponds to the modified screen reader functionality of the element. Upon receipt of such input, detection unit 103 is configured to detect that the user is using a screen reader. Further details of modifying the website and an application, are disclosed below with reference to FIGS. 2-4. Further details of using the modified website are disclosed below with reference to FIG. 5.

Figure 2:
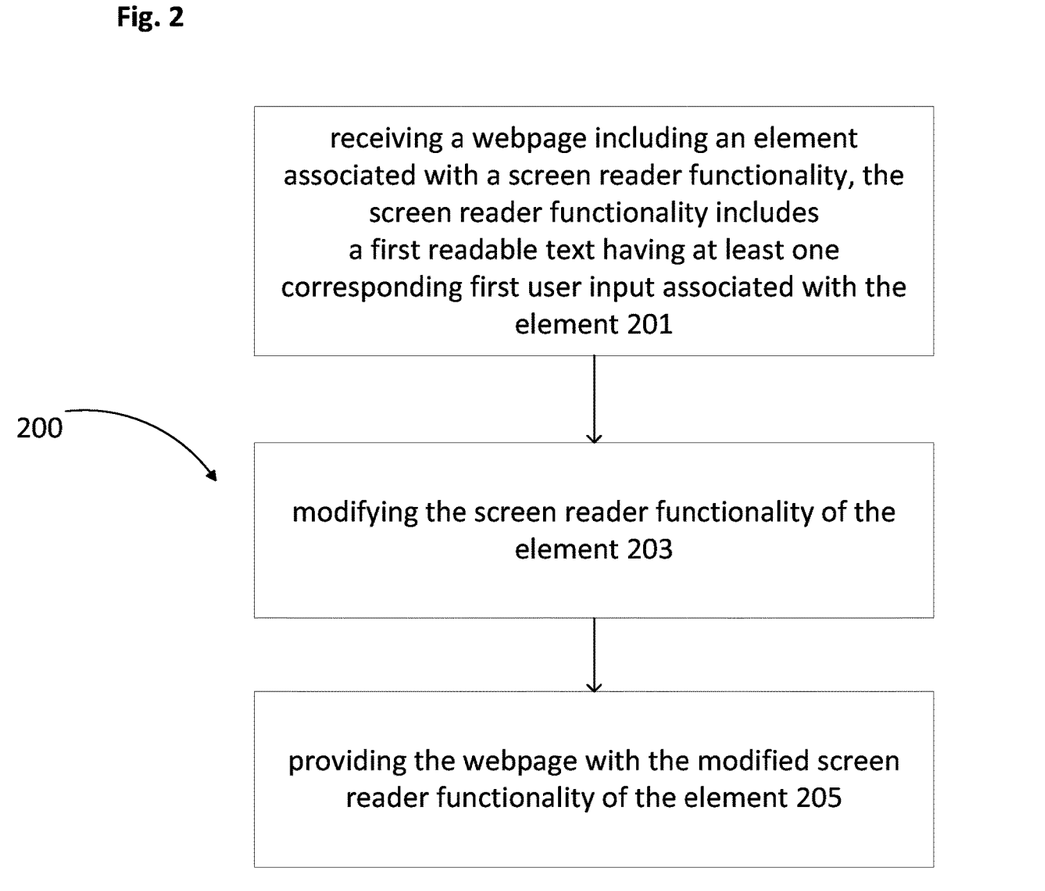
FIG. 2 is a generalized flowchart of operations which are carried out in order to modify a webpage, in accordance with certain embodiments of the presently disclosed subject matter.

With reference to FIG. 2, there is illustrated a generalized flowchart of operations which are carried out in order to modify a webpage, in accordance with certain embodiments of the presently disclosed subject matter.

Before moving on to describe the modification, a webpage of the website is received at a configuration stage. The webpage includes an element that is associated with screen reader functionality. In some examples, the webpage can include more than one element, where each is associated with screen reader functionality. The screen reader functionality includes a first readable text having one or more corresponding first user inputs, that are associated with the element (block 201). With reference to the example of the drop down menu element, the drop down menu element is associated with screen reader functionality. The screen reader functionality includes the readable text of the name of the menu item, and the text of: "to move through items, press the up or down arrow". Once the text is read by the screen reader, a corresponding user input, that is associated with the drop down menu element, for example, pressing an up arrow, is expected to be received. In some examples, more than one corresponding user input is associated with the same element. For example, the drop down menu element may be associated with a first corresponding user input of pressing an up arrow, and simultaneously, another corresponding user input of pressing a down arrow. Both or either of these can be received.

After receiving the webpage with the element, configuration unit 101 described with reference to FIG. 1 is configured to modify the screen reader functionality of the element (block 203), and to provide the webpage with the modified screen reader functionality of the element (block 205). Further details of modifying the screen reader functionality of the element are illustrated with respect to FIG. 3 below.

It should be noted that FIG. 2 is a flowchart illustrating a sequence of operations performed in accordance with examples of the presently disclosed subject matter. Operations described below with reference to FIG. 2 can be executed for example by detection system 100 described above with reference to FIG. 1, however any description of operations in FIG. 2 with reference to functional elements in FIG. 1 is done by way of example only and should not be construed as limiting.

As mentioned above, the service provider may wish to modify the website so as to force the user to provide input that is indicative of usage of the website by the user. Usually, the first readable text associated with the element reflects the functionality of the displayed element. User input that is associated with the element, and which is received in response to reading out the first readable text to the user, represents the action that the user wishes to perform in the webpage with respect to the element with which the user interacts. Associating the element with a modified, different readable text, having predefined modified user input, which is different than the first user input, may force the user to provide another input, other than the input which refers to the functionality of the displayed element.

Figure 3:
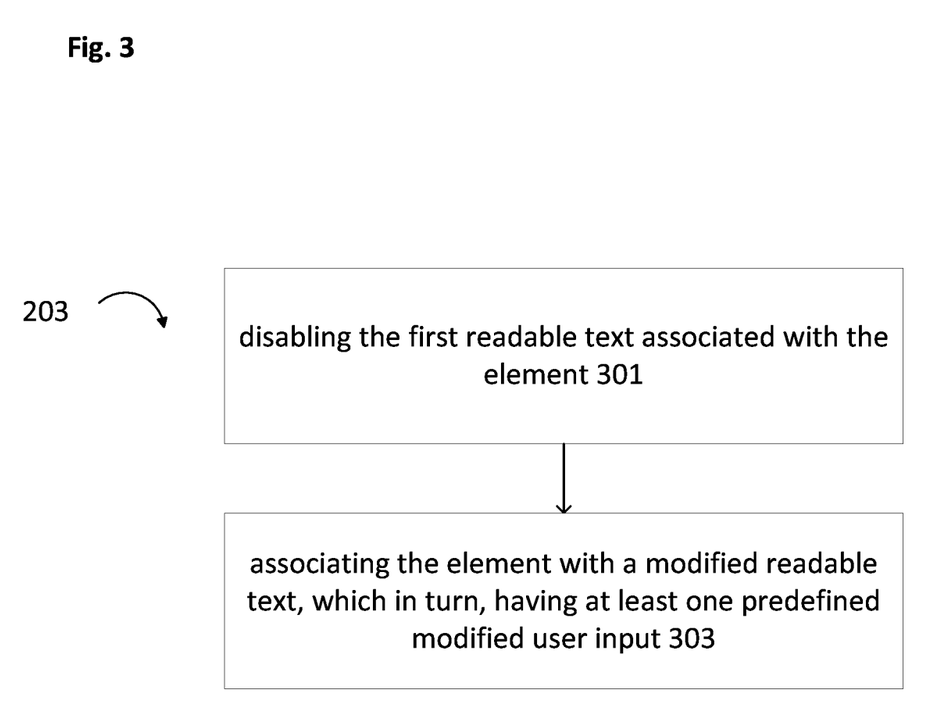
FIG. 3 illustrates a flowchart exemplifying operations which are carried out when modifying a webpage, in accordance with examples of the presently disclosed subject matter.

As explained with reference to block 203 in FIG. 2, the screen reader functionality of the element can be modified. Reference is now made to FIG. 3, illustrating a flowchart exemplifying operations which are carried out when modifying a webpage, in accordance with examples of the presently disclosed subject matter. Modifying the screen reader functionality of the element can be done, e.g. by disabling the first readable text associated with the element (block 301). Disabling the readable text associated with an element, causes the element not to be accessible to visually impaired users, as the element practically becomes "invisible" to them. In some examples, configuration unit 101 is configured to modify the screen reader functionality of more than one element, or to modify the screen reader functionality of all the elements displayed in the webpage, by disabling the respective first readable text associated with each of the elements. In such examples, the webpage becomes "blank" in terms of accessibility, i.e. to visually impaired users, the webpage does not include any element, as none has associated readable text.

After disabling the first readable text associated the element, configuration unit 101 can be further configured to associate the element with a modified readable text, which, in turn, has predefined modified user input (block 303). Receipt of the predefined modified user input, after the modified webpage is provided to the user, is indicative of usage of a screen reader. In some cases, the modified readable text has more than one predefined modified user input, wherein receipt of either one of the predefined modified user inputs is indicative of usage of a screen reader.

Referring once again to the drop down menu example, the screen reader functionality of drop down menu can be modified by disabling the associated text referring to the name of the drop down menu and the text of "to move through items press the up or down arrow". In addition, the drop down menu can be associated with a modified readable text of: "if you are using screen reader, please press F1". The modified readable text has predefined modified user input of pressing F1 (instead of pressing an up or down arrow, which was the original user input to the drop down menu). Receiving input of the F1 button pressed by the user, after the modified webpage is provided to the user, is indicative of usage of a screen reader by the user.

As explained above in the general case of a webpage, usually input associated with an element represents the action that the user wishes to perform with respect to the element with which the user interacts. For example, pressing an up arrow constitutes input to the drop down menu.

In some examples, the modified readable text differs from the first readable text associated with the element. In addition, or alternatively, the predefined modified user input differs from the corresponding first user input associated with the element. If the modified readable text has more than one predefined modified user input, then, in some cases, each of the predefined modified user inputs differs from the corresponding first user input associated with the element. For example, the drop down menu can be associated with a modified readable text of: "if you are using screen reader, please press F1. If not, please press F2". Receipt of either F1 or F2, after the modified webpage is provided to the user, as a modified user input, may be indicative of usage of a screen reader, as the user must have been using the screen reader, in order to hear the text and provide input that relates to that modified readable text. Hence, mere receipt of such input is indicative of screen reader usage, irrespective of the input itself—i.e. F2 and not F1.

Figure 4:
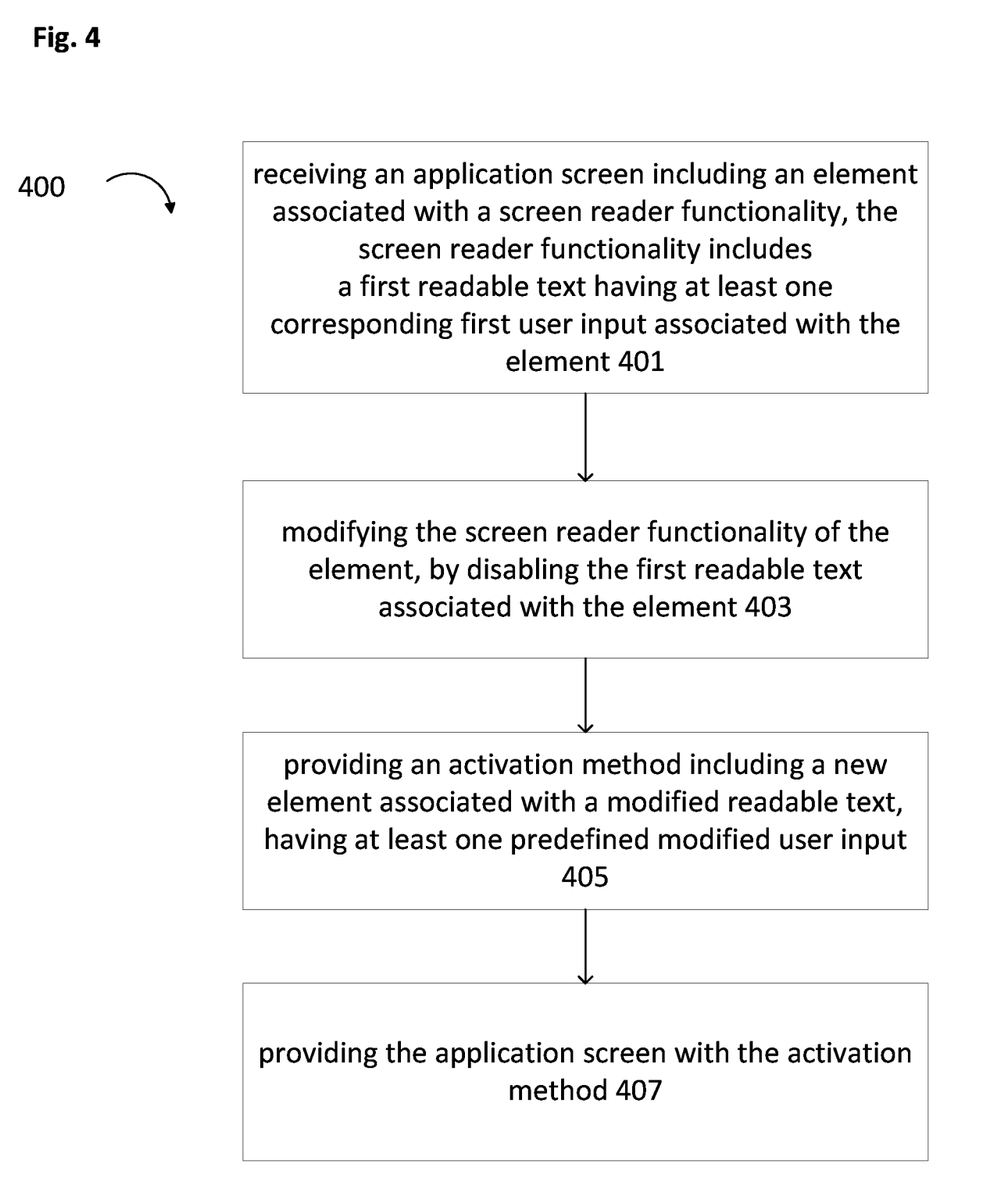
FIG. 4 is a generalized flowchart of operations which are carried out in order to modify an application screen, in accordance with certain embodiments of the presently disclosed subject matter.

Moving on to FIG. 4, it illustrates a generalized flowchart of operations which are carried out in order to modify an application screen, in accordance with certain embodiments of the presently disclosed subject matter. Operations described below with reference to FIG. 4 can be executed for example by a service provider, e.g. detection system 100, of an application software having elements capable of receiving touch inputs, e.g. applications designed to run on mobile devices such as smartphones and tablet computers. However, any description of the operations in FIG. 4, including any reference to functional elements in FIG. 1, is presented by way of example only and should not be construed as limiting.

In a similar way to that described above with respect to FIGS. 2 and 3, according to certain embodiments of the presently disclosed subject matter, a service provider may modify an application, by modifying its application screen, so as to force the user to provide input that is indicative of usage of a screen reader. Modifying an application screen can be achieved for example, by configuration unit 101 (as illustrated in FIG. 1) receiving one screen of an application.

The screen includes at least one element that is associated with screen reader functionality. The screen reader functionality includes a first readable text having a corresponding first user input that is associated with the element (block 401). In some examples, a first readable text has more than one corresponding first user input that is associated with the element. A similar example to that described above with respect to FIGS. 2 and 3 can be a screen including a drop down menu element, associated with screen reader functionality including a first readable text of the name of the menu item and the text of: "to move through items, press the up or down arrows". The up or down arrows are displayed on the screen, and can be configured to receive touch input. In some examples, more than one corresponding user input is associated with the same element. For example, the drop down menu element may be associated with a first corresponding user input of pressing an up arrow, and, simultaneously, a second corresponding user input of pressing a down arrow. Both, or either one, can be received. Once the text relating to drop down menu is read by the screen reader after the modified application screen is provided, a touch input of pressing an up or down arrow, is expected to be received.

After receiving the screen with the element, configuration unit 101 is configured to modify the screen reader functionality of the element, by disabling the first readable text associated with the element (block 403). Disabling the readable text associated with an element, causes the element not to be accessible to visually impaired users, as the element practically becomes "invisible" to them. In some examples, configuration unit 101 is configured to modify the screen reader functionality of more than one element, or to modify the screen reader functionality of all the elements displayed on the screen, by disabling the respective first readable text associated with each of the elements. In such examples, the screen becomes "blank" in terms of accessibility, i.e. to visually impaired users, the screen does not include any element, as none has associated readable text.

After disabling the first readable text associated the element, configuration unit 101 can be further configured to provide an activation method including a new element associated with a modified readable text, having a predefined modified user input (block 405). In some examples, the new element has more than one predefined modified user input. For example, the new element can be a new button or link displayed on the screen. The new link can be associated with an exemplary modified readable text of: "if you are using screen reader, please tap twice the Home button". In this example, the predefined modified user input is an input of Home button being tapped twice by the user.

In some examples, the new element is associated with more than one modified readable text, each having a predefined modified user input. In such cases, each modified readable text is activated in response to receipt of predefined modified user input. For instance, the new element is a new button displayed on the screen. The new button is associated with an exemplary modified readable text of: "if you are using screen reader, please tap once the Home button". In this example, the predefined modified user input is input of the Home button being tapped by the user. Once the user has tapped the Home button, a second modified readable text associated with the button is read, such as: "in order to hear the various lists one after the other on the page, please press the L letter".

In some examples, the new element in the activation method is invisible. In such examples, the activation method can be merely the screen interface itself, from which, upon the user hovering over it, the modified readable text is read.

Receipt of predefined modified user input is indicative of usage of a screen reader. Referring to the example above, tapping twice on the Home button is indicative of usage of screen reader functionality.

After providing the activation method, configuration unit 101 is configured to provide the application screen with the activation method (block 407), e.g. by displaying the screen to the user.

Figure 5:
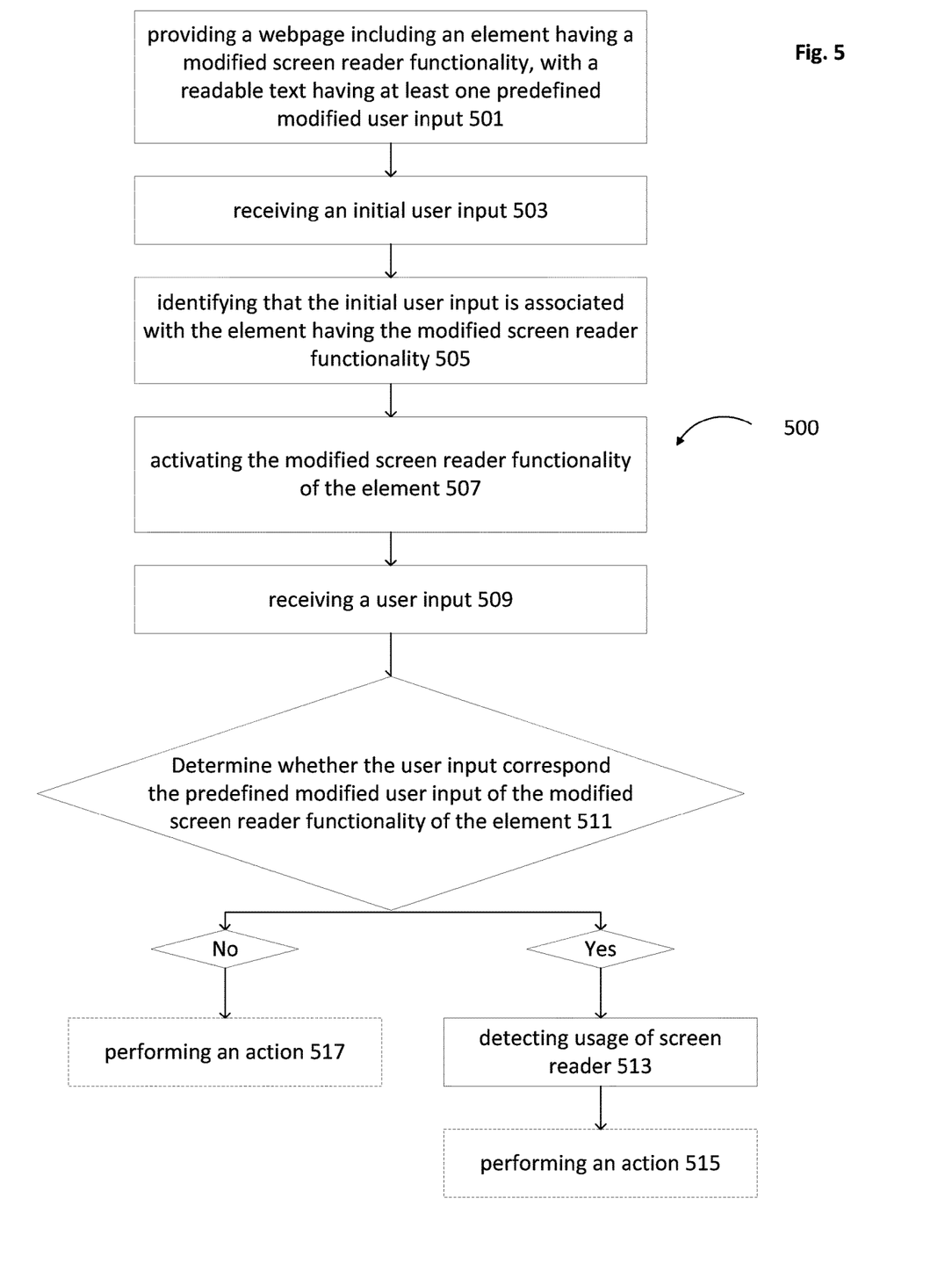
FIG. 5 illustrates a generalized flowchart of using a modified webpage, in accordance with certain embodiments of the presently disclosed subject matter.

FIG. 5 illustrates a generalized flowchart of using a modified webpage, in order to detect usage of a screen reader, in accordance with certain embodiments of the presently disclosed subject matter.

Operations described below with reference to FIG. 5 can be executed for example by detection unit 103 illustrated in FIG. 1. However, any description of the operations in FIG. 4, including any reference to functional elements in FIG. 1, is presented by way of example only and should not be construed as limiting.

As described above, a website may be modified by modifying the screen reader functionality of one or more elements. The screen reader functionality may be modified, e.g. by disabling a first readable text associated with the element and associating the element with a modified readable text. The modified readable text may have one or more predefined modified user inputs.

After modifying the screen reader functionality of at least one element, the webpage with the modified screen reader functionality may be provided, e.g. by displaying the webpage to a user (block 501). Providing the webpage may be carried out e.g. by detection unit 103 illustrated in FIG. 1. In response to providing the webpage, a user may provide initial input. By way of example only, initial input may be hovering over one or more elements of the website with the mouse. In response, detection unit 103 is configured to receive initial user input (block 503). Upon receipt of the initial user input, detection unit 103 is configured to identify that the initial user input is associated with the element having the modified screen reader functionality (block 505) and to activate the modified screen reader functionality of the element (block 507). For example, a user may hover over an element having a modified screen reader functionality, and a modified readable text associated with the element can be activated, and, respectively, be read at the user's end by a screen reader.

After activating the modified screen reader functionality of the element, detection unit 103 is configured to receive another user input (block 509), and to determine whether the user input corresponds to the predefined modified user input of the modified screen reader functionality of the element (block 511). In some cases, the element has more than one predefined modified user input. In such cases, detection unit 103 determines whether the received user input corresponds to any of the predefined modified user inputs of the element.

If the received user input corresponds to the predefined modified user input of the modified screen reader functionality of the element, then detection unit 103 is configured to detect usage of a screen reader (block 513). If, on the other hand, the received user input does not correspond to the predefined modified user input, or any of the predefined modified user inputs, if the element has more than one, then detection unit 103 is configured to determine that there is no usage of a screen reader. After determining whether usage of a screen reader has taken place or not, an action may be taken. Further details of such actions are described below.

Reference is now made to the example described above in which the screen reader functionality of a drop down menu element in a webpage was modified, and a modified readable text of: "if you are using screen reader, please press F1", was associated with the drop down menu. The modified readable text has a predefined modified user input of F1, i.e. receipt of input by the user, by pressing F1.

According to this example, the webpage with the modified screen reader functionality of the drop down menu is provided to the user, i.e. by displaying the modified webpage. The user hovers over the website and the drop down menu, thereby providing first user input. Detection unit 103 receives the first user input, identifies that the user hovered over the drop down menu, and activates its modified screen reader functionality including the modified readable text of: "if you are using screen reader, please press F1". In response, the user presses a button. Detection unit 103 receives input from the user and determines whether the received input, i.e. the pressed button, is F1, which is the predefined modified user input of the modified drop down menu. In case the pressed button is 'F1', detection unit 103 detects usage of a screen reader, and optionally performs another action, as described below with respect to block 515. Alternatively, if the pressed button is not 'F1', then configuration may perform a certain action, as described below with respect to block 517.

In some examples, detection unit 103 is further configured to perform an action (blocks 515 and 517). Some of the possible actions can be taken in both cases (blocks 515 and 517) i.e. irrespective of the detection of screen reader usage, and others are taken only if detection unit 103 detects usage of a screen reader. For example, irrespective of whether detection of screen reader has taken place or not, detection unit 103 is further configured to store and analyze the information on whether usage of screen reader was detected or not. For example, this information can be gathered during a certain time period and be analyzed. For example, such information can be stored in the memory, in processing circuitry 105 illustrated in FIG. 1.

In some examples, after detection of screen reader usage was detected, detection unit 103 is further configured to perform an action (block 515) and cancel the modification that was made to the screen reader functionality of the elements. The cancellation of the modification can be carried out e.g. by disabling the modified readable text previously associated with the element in the configuration stage, and associating the first readable text with the element once again.

After associating the first readable text, detection unit is further configured to activate the first readable text so that the first readable text is read out to the user. In response to activating the first readable text, detection unit 103 is further configured to receive further input from the user, which is the input associated with the first readable text of the element. The website including the elements having the corresponding screen reader functionality can now return to regular operation of the website, i.e. as was operated before the modifications were made in the configuration stage.

It should be noted that the operations described above with reference to FIG. 5 were described with reference to a website having a modified webpage, however the operations are also applicable, mutatis mutandis, to an application with a modified screen, as described with reference to FIG. 4.

It should be noted that the entire description refers to detecting screen reader usage by modifying the screen reader functionality of one or more elements in a webpage. The modified readable text has at least one predefined modified user input. Activating the modified readable text forces the user to provide input that is indicative of usage of the website by the user.

In a similar way, detection of keyboard users (as opposed to mouse users) can be obtained. However, instead of using screen reader functionality of elements, modified elements can be displayed, such that the modified elements have at least one predefined modified user input. Activating the modified elements forces the user to provide input that is indicative of usage of a keyboard. With reference to the example of the drop down menu, a modified drop down menu can be displayed. The modified drop down menu can be the drop down menu with an addition of a header reading: "In order to navigate the menu, press alt+1". In this case, the modified element is the drop down menu with an addition of a header and the predefined modified user input is "alt+1". Receipt of "alt+1" is indicative of usage of a keyboard. In some cases, the modified user input differs from any possible combination of inputs associated with existing elements of the website, such that receipt of the predefined modified user input is indicative of keyboard usage. Detecting keyboard usage can be done in a similar way to that described above with reference to FIGS. 2 to 5 while referring to a modified displayed element (such as the drop down menu with the header) instead of screen reader functionality.

In embodiments of the invention, fewer, more and/or different stages than those shown in FIGS. 2 to 5 may be executed. In embodiments of the invention one or more stages illustrated in FIGS. 2 to 5 may be executed in a different order and/or one or more groups of stages may be executed simultaneously. For example, operations 301 and 303 of FIG. 3 and 403 and 405 of FIG. 4, shown in succession, can be executed substantially concurrently, or in the reverse order. It is also noted that whilst the flow charts are described with reference to elements of detection system 100, this is by no means binding, and the operations can be performed by elements other than those described herein.

FIG. 1 is a schematic illustration of detection system architecture in accordance with embodiments of the invention. Functional elements in FIG. 1 can be made up of any combination of software and hardware, and/or firmware that performs the functions as defined and explained herein. Functional elements in FIG. 1 may be centralized in one location, or dispersed over more than one location. According to some examples of the presently disclosed subject matter, the system may comprise fewer, more and or different modules than those shown in FIG. 1. For example, a single module can comprise both configuration unit 101 and detection unit 103 illustrated separately with respect to FIG. 1.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method comprising:
   detecting usage of a screen reader by a detection system comprised in a computerized system associated with website operator by:
      receiving, at the detection system, a webpage included in a website operated by the website operator, the webpage including at least one element, the at least one element is associated with a first readable text and with at least one first user input
      wherein the at least one element is further associated with screen reader functionality enabling the first readable text to be read by a screen reader;
      modifying the webpage at the detection system, by;
         modifying the screen reader functionality by:
            making the first readable text inoperable to be read by a screen reader; and
            associating the at least one element with a modified readable text;
         wherein the modified screen reader functionality enabling the modified readable text to be read by the screen reader; and
         associating said at least one element with a second user input,
         different from the first user input, wherein the second input is associated with the modified readable text modified from the first readable text,
         wherein the modified webpage is capable of receiving the second user input, and
         wherein the receipt of the second user input is indicative of usage of a screen reader; and
      providing the modified webpage by the detection system for detecting usage of a screen reader by the detection system.

2. The method of claim 1, further comprising:
   receiving a user input;
      in response to determining that the user input corresponds to the second user input, detecting usage of screen reader; and
   performing an action.

3. The method of claim 2, wherein said performing an action includes at least one of performing analytics, and disabling the modified readable text associated with said at least one element and associating said at least one element with the first readable text.

4. A method comprising:
   detecting usage of a screen reader by a detection system comprised in a computerized system associated with a website operator by:
      receiving, at the detection system, an application screen including at least one element, the at least one element is associated with a first readable text and with at least one first user input;
      wherein the at least one element is further associated with screen reader functionality enabling the first readable text to be read by a screen reader
      modifying the application screen at the detection system by:
         making the first readable text inoperable to be read by a screen reader
         modifying the screen reader functionality of the at least one element, by:
         providing a new element,
         the new element is associated with a modified readable text and with a second user input, different from the first user input, wherein the second input is associated with the modified readable text modified from the first readable text,
         wherein the modified screen reader functionality enabling the modified readable text to be read by the screen reader,
         wherein the modified application screen is capable of receiving the second user input and
         wherein receipt of the second user input is indicative of usage of a screen reader; and
      providing the modified application screen by the detection system, for detecting usage of a screen reader by the detection system.

5. The method of claim 4, wherein said new element is invisible.

6. A computerized system associated with a detection system comprised in a computerized system associated with a website operator capable of detecting usage of a screen reader, the system comprising processing circuitry, comprising a processor operatively connected to a memory, wherein the processor is configured to perform the method of claim 1.

7. A computer program product implemented on a non-transitory computer useable medium having computer readable program code embodied therein to cause the computer to perform the method of claim 1.

* * * * *